United States Patent
Wang et al.

(10) Patent No.: US 9,327,438 B2
(45) Date of Patent: May 3, 2016

(54) METHOD FOR FORMING A THERMOPLASTIC COMPOSITION THAT CONTAINS A PLASTICIZED STARCH POLYMER

(75) Inventors: James H. Wang, Appleton, WI (US); Gregory J. Wideman, Menasha, WI (US); JaeHong Lee, Gyeonggi-do (KR)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1147 days.

(21) Appl. No.: 13/330,789

(22) Filed: Dec. 20, 2011

(65) Prior Publication Data

US 2013/0157031 A1      Jun. 20, 2013

(51) Int. Cl.
*B29C 47/00* (2006.01)
*B29C 47/88* (2006.01)
*B29B 9/06* (2006.01)
(Continued)

(52) U.S. Cl.
CPC .............. *B29C 47/0004* (2013.01); *B29B 7/42* (2013.01); *B29B 7/90* (2013.01); *B29B 7/94* (2013.01); *B29B 9/06* (2013.01); *B29C 47/0014* (2013.01); *B29C 47/8815* (2013.01); *B29B 7/46* (2013.01); *B29B 7/728* (2013.01); *B29B 9/02* (2013.01); *B29B 9/16* (2013.01); *B29C 47/0011* (2013.01); *B29C 47/0021* (2013.01); *B29C 47/0066* (2013.01); *B29C 47/30* (2013.01); *B29C 47/34* (2013.01); *B29C 47/884* (2013.01); *B29C 47/8845* (2013.01); *B29C 47/8895* (2013.01); *B29C 2793/009* (2013.01); *B29C 2947/92704* (2013.01); *B29C 2947/92723* (2013.01); *B29C 2947/92923* (2013.01); *B29C 2947/92933* (2013.01); *B29C 2947/92942* (2013.01); *B29K 2003/00* (2013.01); *B29K 2105/0038* (2013.01); *B29K 2995/006* (2013.01); *B29K 2995/0056* (2013.01)

(58) Field of Classification Search
None
See application file for complete search history.

(56) References Cited

U.S. PATENT DOCUMENTS 2,887,725 A   5/1959   Vickers et al.
3,071,485 A   1/1963   Wurzburg et al.
(Continued)

FOREIGN PATENT DOCUMENTS

EP   0 327 505 A2   8/1989
EP   0 327 505 A3   8/1989
(Continued)

OTHER PUBLICATIONS

Wang et al., U.S. Appl. No. 13/330,771, filed Dec. 20, 2011, Method for Forming a Thermoplastic Compositon that Contains a Renewable Biopolymer.
(Continued)

*Primary Examiner* — Jeffrey Wollschlager
(74) *Attorney, Agent, or Firm* — Dority & Manning, P.A.

(57) ABSTRACT

A method and system for melt processing a thermoplastic composition that contains a starch and plasticizer is provided. The composition is melt blended and extruded through a die to form an extrudate, which is thereafter cooled using a multi-stage system of the present invention that includes at least one water-cooling stage and at least one air-cooling stage. More particularly, the extrudate is initially contacted with water for a certain period time so that it becomes partially cooled and solidified on its surface. After the water-cooling stage(s), the extrudate is also subjected to at least one air-cooling stage in which a stream of air is placed into contact with the extrudate.

14 Claims, 3 Drawing Sheets

(51) Int. Cl.
B29B 7/94 (2006.01)
B29B 7/42 (2006.01)
B29B 7/90 (2006.01)
B29B 9/02 (2006.01)
B29C 47/34 (2006.01)
B29K 105/00 (2006.01)
B29C 47/30 (2006.01)
B29B 7/46 (2006.01)
B29B 7/72 (2006.01)
B29B 9/16 (2006.01)

(56) References Cited

U.S. PATENT DOCUMENTS

| | | | |
|---|---|---|---|
| 3,243,308 A | 3/1966 | Barger et al. | |
| 3,354,506 A | 11/1967 | Raley | |
| 3,575,173 A | 4/1971 | Loyer | |
| 3,650,649 A | 3/1972 | Schippers | |
| 3,801,429 A | 4/1974 | Schrenk et al. | |
| 3,854,527 A * | 12/1974 | Maroschak | 165/120 |
| 4,178,277 A * | 12/1979 | Gebauer et al. | 523/219 |
| 4,180,539 A | 12/1979 | Clarke | |
| 4,333,464 A | 6/1982 | Nakano | |
| 4,337,181 A | 6/1982 | Otey et al. | |
| 4,499,154 A | 2/1985 | James et al. | |
| 4,503,098 A | 3/1985 | Potts | |
| 4,789,699 A | 12/1988 | Kieffer et al. | |
| 4,798,603 A | 1/1989 | Meyer et al. | |
| 4,801,494 A | 1/1989 | Datta et al. | |
| 4,886,512 A | 12/1989 | Damico et al. | |
| 4,908,026 A | 3/1990 | Sukiennik et al. | |
| 4,937,299 A | 6/1990 | Ewen et al. | |
| 4,964,857 A | 10/1990 | Osborn | |
| 5,073,455 A | 12/1991 | Nose et al. | |
| 5,095,054 A | 3/1992 | Lay et al. | |
| 5,106,890 A | 4/1992 | Maruhashi et al. | |
| 5,179,164 A | 1/1993 | Lausberg et al. | |
| 5,196,247 A | 3/1993 | Wu et al. | |
| 5,217,803 A | 6/1993 | McBride et al. | |
| 5,218,071 A | 6/1993 | Tsutsui et al. | |
| 5,219,646 A * | 6/1993 | Gallagher et al. | 442/361 |
| 5,242,102 A | 9/1993 | Nicolas | |
| 5,248,309 A | 9/1993 | Serbiak et al. | |
| 5,254,607 A | 10/1993 | McBride et al. | |
| 5,272,236 A | 12/1993 | Lai et al. | |
| 5,278,272 A | 1/1994 | Lai et al. | |
| 5,292,783 A | 3/1994 | Buchanan et al. | |
| 5,300,358 A | 4/1994 | Evers | |
| 5,314,754 A | 5/1994 | Knight | |
| 5,322,728 A | 6/1994 | Davey et al. | |
| 5,346,936 A | 9/1994 | Buehler et al. | |
| 5,350,354 A | 9/1994 | Billmers | |
| 5,405,564 A | 4/1995 | Stepto et al. | |
| 5,412,005 A * | 5/1995 | Bastioli et al. | 524/47 |
| 5,415,643 A | 5/1995 | Kolb | |
| 5,416,181 A | 5/1995 | Nguyen et al. | |
| 5,436,078 A | 7/1995 | Bühler et al. | |
| 5,446,079 A | 8/1995 | Buchanan et al. | |
| 5,452,981 A | 9/1995 | Crorey et al. | |
| 5,461,094 A | 10/1995 | Yoo et al. | |
| 5,462,981 A | 10/1995 | Bastioli et al. | |
| 5,472,775 A | 12/1995 | Obijeski et al. | |
| 5,496,895 A | 3/1996 | Chinnaswamy et al. | |
| 5,506,277 A | 4/1996 | Griesbach et al. | |
| 5,509,913 A | 4/1996 | Yeo | |
| 5,510,401 A | 4/1996 | Dehennau et al. | |
| 5,525,281 A | 6/1996 | Lörcks et al. | |
| 5,539,056 A | 7/1996 | Yang et al. | |
| 5,558,659 A | 9/1996 | Sherrod et al. | |
| 5,559,171 A | 9/1996 | Buchanan et al. | |
| 5,565,509 A | 10/1996 | Nguyen et al. | |
| 5,571,619 A | 11/1996 | McAlpin et al. | |
| 5,580,911 A | 12/1996 | Buchanan et al. | |
| 5,596,052 A | 1/1997 | Resconi et al. | |
| 5,599,293 A | 2/1997 | Orenga et al. | |
| 5,599,858 A | 2/1997 | Buchanan et al. | |
| 5,649,916 A | 7/1997 | DiPalma et al. | |
| 5,662,731 A | 9/1997 | Andersen et al. | |
| 5,665,786 A | 9/1997 | Xu et al. | |
| 5,679,145 A | 10/1997 | Andersen et al. | |
| 5,681,299 A | 10/1997 | Brown | |
| 5,695,868 A | 12/1997 | McCormack | |
| 5,696,186 A | 12/1997 | Videau | |
| 5,700,553 A | 12/1997 | Cohen et al. | |
| 5,722,966 A | 3/1998 | Christon et al. | |
| 5,759,569 A | 6/1998 | Hird et al. | |
| 5,817,721 A | 10/1998 | Warzelhan et al. | |
| 5,823,988 A | 10/1998 | Orenga et al. | |
| 5,848,309 A | 12/1998 | Shimizu | |
| 5,861,461 A | 1/1999 | Lee et al. | |
| 5,873,871 A | 2/1999 | Lavash et al. | |
| 5,900,322 A | 5/1999 | Buchanan et al. | |
| 5,916,678 A | 6/1999 | Jackson et al. | |
| 5,916,969 A | 6/1999 | Wang et al. | |
| 5,932,497 A | 8/1999 | Morman et al. | |
| 5,945,480 A | 8/1999 | Wang et al. | |
| 5,948,710 A | 9/1999 | Pomplun et al. | |
| 5,981,012 A | 11/1999 | Pomplun et al. | |
| 5,985,396 A | 11/1999 | Kerins et al. | |
| 5,997,981 A | 12/1999 | McCormack et al. | |
| 6,011,092 A | 1/2000 | Seppälä et al. | |
| 6,015,764 A | 1/2000 | McCormack et al. | |
| 6,075,118 A | 6/2000 | Wang et al. | |
| 6,075,179 A | 6/2000 | McCormack et al. | |
| 6,090,325 A | 7/2000 | Wheat et al. | |
| 6,096,809 A * | 8/2000 | Lorcks et al. | 524/47 |
| 6,110,158 A | 8/2000 | Kielpikowski | |
| 6,111,163 A | 8/2000 | McCormack et al. | |
| 6,160,199 A | 12/2000 | Noda | |
| 6,174,990 B1 | 1/2001 | Noda | |
| 6,214,907 B1 | 4/2001 | Tomka | |
| 6,231,970 B1 * | 5/2001 | Andersen et al. | 428/332 |
| 6,235,815 B1 * | 5/2001 | Loercks et al. | 524/47 |
| 6,235,816 B1 | 5/2001 | Lorcks et al. | |
| 6,242,102 B1 | 6/2001 | Tomka | |
| 6,258,427 B1 | 7/2001 | Kerins et al. | |
| 6,258,924 B1 | 7/2001 | Warzelhan et al. | |
| 6,288,184 B1 | 9/2001 | Wilson, Jr. et al. | |
| 6,294,238 B1 | 9/2001 | Pomplun et al. | |
| 6,296,914 B1 | 10/2001 | Kerins et al. | |
| 6,309,736 B1 | 10/2001 | McCormack et al. | |
| 6,312,756 B1 | 11/2001 | Dudacek et al. | |
| 6,323,265 B1 | 11/2001 | Bengs et al. | |
| 6,348,524 B2 | 2/2002 | Bastioli et al. | |
| 6,380,445 B1 | 4/2002 | Rietz et al. | |
| 6,387,528 B1 | 5/2002 | Pomplun et al. | |
| 6,436,498 B1 | 8/2002 | Rangwalla et al. | |
| 6,461,457 B1 | 10/2002 | Taylor et al. | |
| 6,472,497 B2 | 10/2002 | Loercks et al. | |
| 6,479,105 B2 | 11/2002 | Chang et al. | |
| 6,489,533 B2 | 12/2002 | Imai et al. | |
| 6,495,080 B1 | 12/2002 | Tsai et al. | |
| 6,500,563 B1 | 12/2002 | Datta et al. | |
| 6,511,465 B1 | 1/2003 | Freiburger et al. | |
| 6,514,602 B1 | 2/2003 | Zhao et al. | |
| 6,515,054 B1 | 2/2003 | Matsushita et al. | |
| 6,530,910 B1 | 3/2003 | Pomplun et al. | |
| 6,531,642 B2 | 3/2003 | Kurata et al. | |
| 6,534,610 B1 | 3/2003 | Wilson, Jr. et al. | |
| 6,563,399 B2 | 5/2003 | Love | |
| 6,564,399 B2 | 5/2003 | Teal | |
| 6,573,340 B1 | 6/2003 | Khemani et al. | |
| 6,605,657 B1 | 8/2003 | Favis et al. | |
| 6,607,819 B2 | 8/2003 | Wang et al. | |
| 6,616,787 B2 | 9/2003 | Imai et al. | |
| 6,638,603 B1 | 10/2003 | Kerins et al. | |
| 6,663,611 B2 | 12/2003 | Blaney et al. | |
| 6,716,203 B2 | 4/2004 | Sorebo et al. | |
| 6,747,186 B2 | 6/2004 | Shimizu | |
| 6,783,826 B2 | 8/2004 | Sherrod et al. | |
| 6,824,734 B2 | 11/2004 | Boggs et al. | |
| 6,844,380 B2 | 1/2005 | Favis et al. | |
| 6,888,044 B2 | 5/2005 | Fell et al. | |

(56) References Cited

U.S. PATENT DOCUMENTS

| | | | |
|---|---|---|---|
| 6,890,872 B2 | 5/2005 | Bond et al. | |
| 6,897,168 B2 | 5/2005 | Branham et al. | |
| 6,908,966 B2 | 6/2005 | Chang et al. | |
| 6,946,506 B2 | 9/2005 | Bond et al. | |
| 6,958,371 B1 | 10/2005 | Wang et al. | |
| 6,960,371 B2 | 11/2005 | Bunyard et al. | |
| 6,994,865 B2 | 2/2006 | Branham et al. | |
| 7,012,116 B1 | 3/2006 | Schertz et al. | |
| 7,025,908 B1 | 4/2006 | Hayashi et al. | |
| 7,077,994 B2 | 7/2006 | Bond et al. | |
| 7,094,817 B2 | 8/2006 | Halley | |
| 7,098,292 B2 | 8/2006 | Zhao et al. | |
| 7,176,251 B1 | 2/2007 | Bastioli et al. | |
| 7,176,349 B1 | 2/2007 | Dhugga et al. | |
| 7,179,245 B2 | 2/2007 | Giori | |
| 7,208,535 B2 | 4/2007 | Asrar et al. | |
| 7,214,414 B2 | 5/2007 | Khemani et al. | |
| 7,267,794 B2 | 9/2007 | Amick | |
| 7,276,361 B2 | 10/2007 | Doi et al. | |
| 7,297,394 B2 | 11/2007 | Khemani et al. | |
| 7,368,503 B2 | 5/2008 | Hale | |
| 7,517,339 B2 | 4/2009 | Pedersen et al. | |
| 7,608,649 B2 | 10/2009 | Sun et al. | |
| 7,629,405 B2 | 12/2009 | Narayan et al. | |
| 7,678,444 B2 | 3/2010 | Tedford, Jr. et al. | |
| 7,854,994 B2 | 12/2010 | Henderson-Rutgers et al. | |
| 7,902,094 B2 | 3/2011 | Haile et al. | |
| 7,951,436 B2 | 5/2011 | Knoerzer et al. | |
| 7,951,438 B2 | 5/2011 | Lee et al. | |
| 7,998,888 B2 | 8/2011 | Shi et al. | |
| 8,188,185 B2 | 5/2012 | Wang et al. | |
| 8,226,622 B2 | 7/2012 | Mitchler et al. | |
| 8,296,114 B2 | 10/2012 | Prasad et al. | |
| 8,329,977 B2 | 12/2012 | Wang et al. | |
| 8,690,560 B2 | 4/2014 | Scheurich | |
| 2002/0028857 A1 | 3/2002 | Holy | |
| 2002/0094444 A1 | 7/2002 | Nakata et al. | |
| 2002/0111596 A1 | 8/2002 | Fletcher et al. | |
| 2002/0188041 A1* | 12/2002 | Bond et al. | 524/47 |
| 2003/0116462 A1 | 6/2003 | Sorebo et al. | |
| 2004/0060112 A1 | 4/2004 | Fell et al. | |
| 2004/0242772 A1* | 12/2004 | Huth et al. | 525/56 |
| 2004/0267217 A1 | 12/2004 | Dave et al. | |
| 2005/0245162 A1 | 11/2005 | McCormack et al. | |
| 2005/0258567 A1 | 11/2005 | Wang | |
| 2005/0282456 A1 | 12/2005 | Zhao et al. | |
| 2006/0068200 A1 | 3/2006 | Cleckner et al. | |
| 2007/0042207 A1 | 2/2007 | Berger et al. | |
| 2007/0241483 A1 | 10/2007 | Bastioli et al. | |
| 2007/0264460 A1 | 11/2007 | Del Tredici | |
| 2008/0033093 A1 | 2/2008 | Menceloglu et al. | |
| 2008/0036115 A1* | 2/2008 | Ueda et al. | 264/291 |
| 2008/0287592 A1 | 11/2008 | Favis et al. | |
| 2009/0017240 A1 | 1/2009 | Charbonnel et al. | |
| 2009/0048368 A1* | 2/2009 | Bash et al. | 523/122 |
| 2009/0286090 A1 | 11/2009 | Ting et al. | |
| 2009/0286906 A1* | 11/2009 | Shi et al. | 524/47 |
| 2010/0272940 A1 | 10/2010 | Shi et al. | |
| 2010/0305271 A1 | 12/2010 | Mentink et al. | |
| 2010/0311905 A1* | 12/2010 | Mentink et al. | 525/54.31 |
| 2012/0009387 A1 | 1/2012 | Wang et al. | |
| 2012/0315454 A1 | 12/2012 | Wang et al. | |
| 2013/0011593 A1 | 1/2013 | Wang et al. | |
| 2013/0046262 A1 | 2/2013 | Wang et al. | |

FOREIGN PATENT DOCUMENTS

| | | |
|---|---|---|
| EP | 0 417 828 A1 | 3/1991 |
| EP | 0 809 680 B1 | 12/1997 |
| EP | 0 947 559 B1 | 10/1999 |
| EP | 1 116 748 A1 | 7/2001 |
| WO | WO 92/02199 A1 | 2/1992 |
| WO | WO 96/20831 A1 | 7/1996 |
| WO | WO 97/06925 A1 | 2/1997 |
| WO | WO 98/36018 A1 | 8/1998 |
| WO | WO 2005/011956 A2 | 2/2005 |
| WO | WO 2005/011956 A3 | 2/2005 |
| WO | WO 2005/116118 A1 | 12/2005 |
| WO | WO 2006/117801 A2 | 11/2006 |
| WO | WO 2006/117801 A3 | 11/2006 |
| WO | WO 2010/012041 A1 | 2/2010 |
| WO | WO 2010/051589 A1 | 5/2010 |
| WO | WO 2010/131134 A2 | 11/2010 |
| WO | WO 2010/131134 A3 | 11/2010 |
| WO | WO 2011/020170 A1 | 2/2011 |
| WO | WO 2011/080623 A2 | 7/2011 |
| WO | WO 2011/080623 A3 | 7/2011 |

OTHER PUBLICATIONS

Wang et al., U.S. Appl. No. 13/330,820, filed Dec. 20, 2011, Multi-Layered Film Containing a Biopolymer.
Abstract of German Patent—DE19802718 A1, Jul. 29, 1999, 2 pages.
Abstract of Japanese Patent—JP9143893, Jun. 3, 1997, 1 page.
Machine Translation of Japanese Patent—JP2005-329658, Dec. 2, 2005, 12 pages.
ASTM D 1238-01—Standard Test Method for Melt Flow Rates of Thermoplastics by Extrusion Plastometer, Current Edition Approved Aug. 10, 2001, 12 pages.
ASTM D 1505-10—Standard Test Method for Density of Plastics by the Density-Gradient Technique, Current Edition Approved Jul. 1, 2010, 7 pages.
ASTM D 3418-08 (3417-99)—Standard Test Method for Temperatures and Enthalpies of Fusion and Crystallization of Polymers by Differential Scanning Calorimetry, Current Edition Approved Nov. 1, 2008, 7 pages.
ASTM D 5034-09—Standard Test Method for Breaking Strength and Elongation of Textile Fabrics (Grab Test), Current Edition Approved Jan. 15, 2009, 8 pages.
ASTM D 5338-11—Standard Test Method for Determining Aerobic Biodegradation of Plastic Materials Under Controlled Composting Conditions. Incorporating Thermophilic Temperatures, Current Edition Approved Apr. 1, 2011, 6 pages.
ASTM D 638-08—Standard Test Method for Tensile Properties for Plastics, Current Edition Approved Apr. 1, 2008, 16 pages.
Related U.S. Patent Applications.
Abstract of Japanese Patent—JPH06114929, Apr. 26, 1994, 2 pages.
Abstract of Japanese Patent—JP2008125799, Jun. 5, 2008, 2 pages.
Abstract of Japanese Patent—JP2011104927, Jun. 2, 2011, 1 page.
Search Report and Written Opinion for PCT/IB2012/057438 dated May 15, 2013, 14 pages.
Abstract of French Patent—FR2284420 A1, Apr. 9, 1976, 1 page.
Abstract of Japanese Patent—JP2002265027A, Sep. 18, 2002, 2 pages.
Supplementary European Search Report dated Jun. 25, 2015, 9 pages.
Abstract of Japanese Patent—JP 2010036341, Feb. 18, 2010, 1 page.
Abstract of Japanese Patent—JP 2011-212842, Oct. 27, 2011, 1 page.

* cited by examiner

METHOD FOR FORMING A THERMOPLASTIC COMPOSITION THAT CONTAINS A PLASTICIZED STARCH POLYMER

BACKGROUND OF THE INVENTION

Thermoplastic starches, either alone or in combination with other polymers, are often used in the manufacture of articles for which water or biological degradation are considered important. The thermoplastic starch is typically formed by plasticizing a starch with a functional plasticizer or mixture of plasticizers. One of the problems with conventional thermoplastic starches, however, is that they are hygroscopic and have a tendency to absorb substantial amounts of water, which can cause an issue during thermoplastic processing and a reduction in mechanical strength, ductility and toughness. To avoid the absorption of water, thermoplastic starches are thus generally cooled using a waterless system, which can be very slow and expensive. As such, a need currently exists for a more efficient and less costly method for processing thermoplastic starches.

SUMMARY OF THE INVENTION

In accordance with one embodiment of the present invention, a method for forming a thermoplastic starch-based composition is disclosed. The method comprises melt extruding a thermoplastic composition through a die to form an extrudate, wherein the thermoplastic composition comprises a starch polymer and plasticizer. The extrudate is subjected to at least one water-cooling stage in which the extrudate is contacted with water for a first period of time. Thereafter, the water-cooled extrudate is subjected to at least one air-cooling state in which the extrudate is contacted with air for a second period of time. The air-cooled extrudate has a moisture content of from about 500 to about 20,000 parts per million.

In accordance with another embodiment of the present invention, a system for forming a thermoplastic starch-based composition is disclosed. The system comprises a supply of a starch polymer and a plasticizer, an extruder and a die. The starch polymer and plasticizer are capable of being melt blended within the extruder and through the die to form an extrudate. The system also comprises at least one water-cooling stage located downstream from the extruder and die, which comprises a water bath within which the extrudate is immersed upon exiting the die. At least one air-cooling stage is also located downstream from the water-cooling stage that is configured to supply a stream of air into contact with the extrudate upon exiting the water bath.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
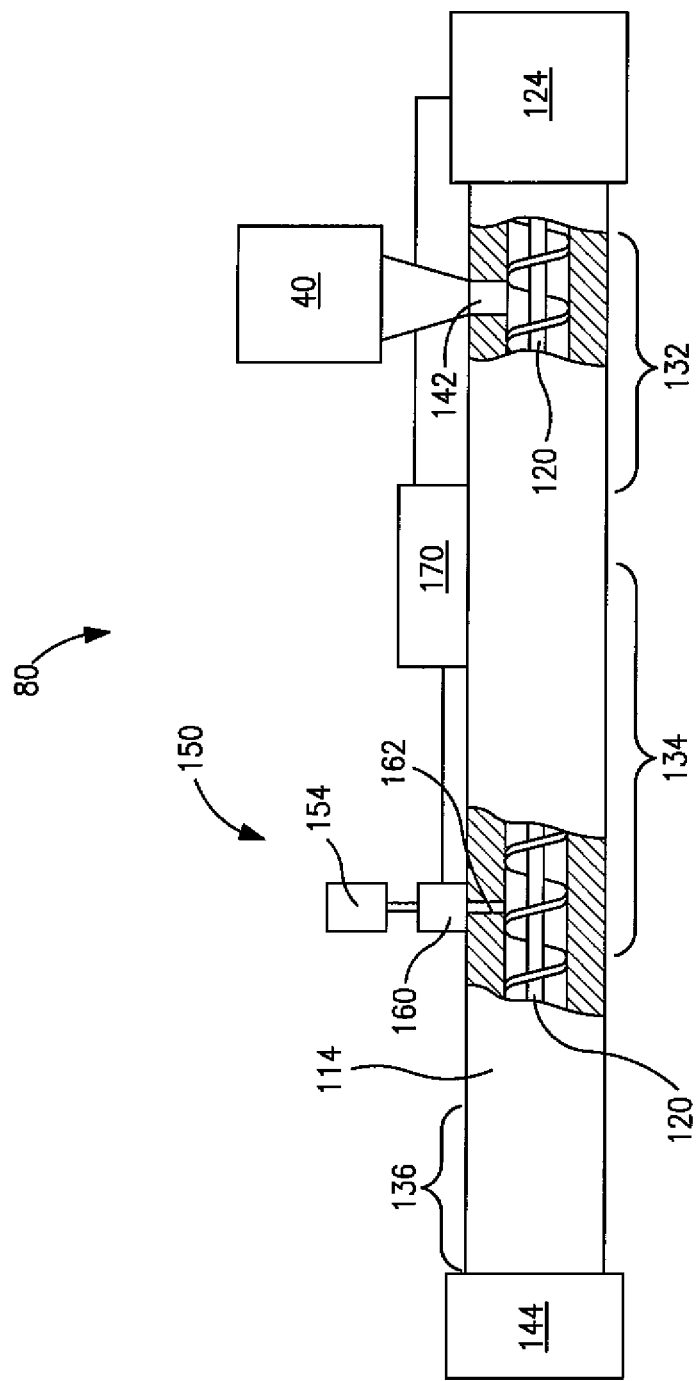
FIG. 1 is a partially broken away side view of an extruder that may be used in one embodiment of the present invention.

Repeat use of reference characters in the present specification and drawings is intended to represent same or analogous features or elements of the invention.

DETAILED DESCRIPTION OF REPRESENTATIVE EMBODIMENTS

Definitions

As used herein, the term "biodegradable" generally refers to a material that degrades from the action of naturally occurring microorganisms, such as bacteria, fungi, and algae; environmental heat; moisture; or other environmental factors. The degree of degradation may be determined according to ASTM Test Method 5338.92.

DETAILED DESCRIPTION

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a method and system for melt processing a thermoplastic composition that contains a starch and plasticizer. The composition is melt blended and extruded through a die to form an extrudate, which is thereafter cooled using a multi-stage system that includes at least one water-cooling stage and at least one air-cooling stage. More particularly, the extrudate is initially contacted with water for a certain period time so that it becomes partially cooled and solidified on its surface. After the water-cooling stage(s), the partially cooled and solidified extrudate is also subjected to at least one air-cooling stage in which a stream of air is placed into contact with the extrudate. Because it is at least partially solidified, the extrudate can lack tackiness and possess sufficient strength so that it can handle the stream of air without physically degrading. During the air-cooling stage, water can be quickly removed from the surface to avoid moisture absorption by the starch polymer, which could otherwise lead to the formation of moisture bubbles during melt extrusion. By selectively controlling certain parameters of each of the cooling stages, the present inventors have discovered that the melt blended starch/plasticizer mixture does not absorb so much water that the resulting melt processability and mechanical properties are adversely impacted. To the contrary, as explained in more detail below, it has been unexpectedly discovered that an extrudate cooled in accordance with the present invention may actually possess even better mechanical properties than a system in which only air cooling is used. Furthermore, the combination of a water-cooling stage with an air-cooling stage can significantly enhance processing efficiency and reduce the total amount of energy needed to cool the extrudate.

Various embodiments of the present invention will now be described in more detail.

I. Thermoplastic Composition

A. Starch Polymer

Starch is a natural polymer composed of amylose and amylopectin. Amylose is essentially a linear polymer having a molecular weight in the range of 100,000-500,000, whereas amylopectin is a highly branched polymer having a molecular weight of up to several million. Although starch is produced in many plants, typical sources includes seeds of cereal grains, such as corn, waxy corn, wheat, sorghum, rice, and waxy rice; tubers, such as potatoes; roots, such as tapioca (i.e., cassava and manioc), sweet potato, and arrowroot; and the pith of the sago palm. Broadly speaking, any natural (unmodified) and/or modified starch may be employed in the present invention. Modified starches, for instance, are often employed that have been chemically modified by typical processes known in the art (e.g., esterification, etherification, oxidation, acid hydrolysis, enzymatic hydrolysis, etc.). Starch ethers and/or esters may be particularly desirable, such as hydroxyalkyl starches, carboxymethyl starches, etc. The hydroxyalkyl group of hydroxylalkyl starches may contain, for instance, 1 to 10 carbon atoms, in some embodiments from 1 to 6 carbon atoms, in some embodiments from 1 to 4 carbon atoms, and in some embodiments, from 2 to 4 carbon atoms. Representative hydroxyalkyl starches such as hydroxyethyl starch, hydroxypropyl starch, hydroxybutyl starch, and derivatives thereof. Starch esters, for instance, may be prepared using a wide variety of anhydrides (e.g., acetic, propionic, butyric, and so forth), organic acids, acid chlorides, or other esterification reagents. The degree of esterification may vary as desired, such as from 1 to 3 ester groups per glucosidic unit of the starch.

Regardless of whether it is in a native or modified form, the starch may contain different percentages of amylose and amylopectin, different size starch granules and different polymeric weights for amylose and amylopectin. High amylose starches contain greater than about 50% by weight amylose and low amylose starches contain less than about 50% by weight amylose. Although not required, low amylose starches having an amylose content of from about 10% to about 40% by weight, and in some embodiments, from about 15% to about 35% by weight, are particularly suitable for use in the present invention. Examples of such low amylose starches include corn starch and potato starch, both of which have an amylose content of approximately 20% by weight. Such low amylose starches typically have a number average molecular weight ("$M_n$") ranging from about 50,000 to about 1,000,000 grams per mole, in some embodiments from about 75,000 to about 800,000 grams per mole, and in some embodiments, from about 100,000 to about 600,000 grams per mole, as well as a weight average molecular weight ("$M_w$") ranging from about 5,000,000 to about 25,000,000 grams per mole, in some embodiments from about 5,500,000 to about 15,000,000 grams per mole, and in some embodiments, from about 6,000,000 to about 12,000,000 grams per mole. The ratio of the weight average molecular weight to the number average molecular weight ("$M_w/M_n$"), i.e., the "polydispersity index", is also relatively high. For example, the polydispersity index may range from about 20 to about 100. The weight and number average molecular weights may be determined by methods known to those skilled in the art.

B. Plasticizer

As indicated above, a liquid plasticizer is also employed in the thermoplastic composition to help render the starch melt-processable. For example, starches normally exist in the form of granules that have a coating or outer membrane that encapsulates the more water-soluble amylose and amylopectin chains within the interior of the granule. When heated, polar solvents ("plasticizers") may soften and penetrate the outer membrane and cause the inner starch chains to absorb water and swell. This swelling will, at some point, cause the outer shell to rupture and result in an irreversible destructurization of the starch granule. Once destructurized, the starch polymer chains containing amylose and amylopectin polymers, which are initially compressed within the granules, will stretch out and form a generally disordered intermingling of polymer chains. Upon resolidification, however, the chains may reorient themselves to form crystalline or amorphous solids having varying strengths depending on the orientation of the starch polymer chains. Because the starch (natural or modified) is thus capable of melting and resolidifying, it is generally considered a "thermoplastic starch."

Suitable liquid plasticizers may include, for instance, polyhydric alcohol plasticizers, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, glycerol (or glycerin), and sorbitol), polyols (e.g., ethylene glycol, propylene glycol, dipropylene glycol, butylene glycol, and hexane triol), etc. Also suitable are hydrogen bond forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers may include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic acids may also be used, such as ethylene acrylic acid, ethylene maleic acid, butadiene acrylic acid, butadiene maleic acid, propylene acrylic acid, propylene maleic acid, and other hydrocarbon based acids. A low molecular weight plasticizer is preferred, such as less than about 20,000 g/mol, preferably less than about 5,000 g/mol and more preferably less than about 1,000 g/mol.

The relative amount of starch polymers and plasticizers employed in the thermoplastic composition may vary depending on a variety of factors, such as the molecular weight of the starch, the type of starch (e.g., modified or unmodified), the affinity of the plasticizer for the starch, etc. Typically, however, the weight ratio of starches to plasticizers is from about 1 to about 10, in some embodiments from about 1.5 to about 8, and in some embodiments, from about 2 to about 6. For example, starches may constitute from about 5 wt. % to about 50 wt. %, in some embodiments from about 10 wt. % to about 40 wt. %, and in some embodiments, from about 15 wt. % to about 30 wt. % of the composition, while plasticizers may constitute from about 0.5 wt. % to about 20 wt. %, in some embodiments from about 1 wt. % to about 15 wt. %, and in some embodiments, from about 5 wt. % to about 10 wt. % of the composition. It should be understood that the weight of starches referenced herein includes any bound water that naturally occurs in the starch before mixing it with other components to form the thermoplastic starch. Starches, for instance, typically have a bound water content of about 5% to 16% by weight of the starch.

C. Other Optional Components

Of course, one or more additional components may also be employed in the thermoplastic composition to facilitate its use in various types of substrates. Various examples of such optional components are referenced below.

i. Dispersion Aid

Dispersion aids may be employed in certain embodiments to help create a uniform dispersion of the starch/plasticizer and retard or prevent separation of the thermoplastic starch into constituent phases. Likewise, the dispersion aids may also improve the water dispersibility of the substrate when it is a desired feature. When employed, the dispersion aid(s) typically constitute from about 0.01 wt. % to about 10 wt. %, in some embodiments from about 0.1 wt. % to about 5 wt. %, and in some embodiments, from about 0.5 wt. % to about 4 wt. % of the thermoplastic composition.

Although any dispersion aid may generally be employed in the present invention, surfactants having a certain hydrophilic/lipophilic balance ("HLB") may improve the long-term stability of the composition. The HLB index is well known in the art and is a scale that measures the balance between the hydrophilic and lipophilic solution tendencies of a compound. The HLB scale ranges from 1 to approximately 50, with the lower numbers representing highly lipophilic tendencies and the higher numbers representing highly hydrophilic tendencies. In some embodiments of the present invention, the HLB value of the surfactants is from about 1 to about 20, in some embodiments from about 1 to about 15 and in some embodiments, from about 2 to about 10. If desired, two or more surfactants may be employed that have HLB values either below or above the desired value, but together have an average HLB value within the desired range.

One particularly suitable class of surfactants for use in the present invention are nonionic surfactants, which typically have a hydrophobic base (e.g., long chain alkyl group or an alkylated aryl group) and a hydrophilic chain (e.g., chain containing ethoxy and/or propoxy moieties). For instance, some suitable nonionic surfactants that may be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, fatty acid esters, monoglyceride or diglycerides of long chain alcohols, and mixtures thereof. In one particular embodiment, the nonionic surfactant may be a fatty acid ester, such as a sucrose fatty acid ester, glycerol fatty acid ester, propylene glycol fatty acid ester, sorbitan fatty acid ester, pentaerythritol fatty acid ester, sorbitol fatty acid ester, and so forth. The fatty acid used to form such esters may be saturated or unsaturated, substituted or unsubstituted, and may contain from 6 to 22 carbon atoms, in some embodiments from 8 to 18 carbon atoms, and in some embodiments, from 12 to 14 carbon atoms. In one particular embodiment, mono- and di-glycerides of fatty acids may be employed in the present invention.

ii. Additional Biodegradable Polymer

Generally speaking, a majority of the polymers employed in the composition are biodegradable polymers. For example, from about 50 wt. % to about 90 wt. %, in some embodiments from about 55 wt. % to about 80 wt. %, and in some embodiments, from about 60 wt. % to about 75 wt. % of the polymers employed in the composition are biodegradable polymers. In one embodiment, for example, substantially all of the biodegradable polymers are starch polymers, such as described above. Alternatively, however, other types of biodegradable polymers may also be employed to help further improve the ability to melt process the thermoplastic composition. In such embodiments, the additional biodegradable polymers may constitute from about 10 wt. % to about 70 wt. %, in some embodiments from about 20 wt. % to about 60 wt. %, and in some embodiments, from about 30 wt. % to about 50 wt. % of the polymer content of the thermoplastic composition, while the starch polymers may likewise constitute from about 1 wt. % to about 35 wt. %, in some embodiments from about 5 wt. % to about 30 wt. %, and in some embodiments, from about 10 wt. % to about 25 wt. % of the polymer content of the thermoplastic composition.

One particularly suitable type of additional biodegradable polymer that may be employed in conjunction with the starch polymer is a biodegradable polyester. Such biodegradable polyesters typically have a relatively low glass transition temperature ("$T_g$") to reduce stiffness of the film and improve the processability of the polymers. For example, the $T_g$ may be about 25° C. or less, in some embodiments about 0° C. or less, and in some embodiments, about −10° C. or less. Likewise, the melting point of the biodegradable polyesters is also relatively low to improve the rate of biodegradation. For example, the melting point is typically from about 50° C. to about 180° C., in some embodiments from about 80° C. to about 160° C., and in some embodiments, from about 100° C. to about 140° C. The melting temperature and glass transition temperature may be determined using differential scanning calorimetry ("DSC") in accordance with ASTM D-3417 as is well known in the art. Such tests may be employed using a THERMAL ANALYST 2910 Differential Scanning calorimeter (outfitted with a liquid nitrogen cooling accessory) and with a THERMAL ANALYST 2200 (version 8.10) analysis software program, which is available from T.A. Instruments Inc. of New Castle, Del.

The biodegradable polyesters may also have a number average molecular weight ("$M_n$") ranging from about 40,000 to about 120,000 grams per mole, in some embodiments from about 50,000 to about 100,000 grams per mole, and in some embodiments, from about 60,000 to about 85,000 grams per mole. Likewise, the polyesters may also have a weight average molecular weight ("$M_w$") ranging from about 70,000 to about 240,000 grams per mole, in some embodiments from about 80,000 to about 190,000 grams per mole, and in some embodiments, from about 100,000 to about 150,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 4.0, in some embodiments from about 1.2 to about 3.0, and in some embodiments, from about 1.4 to about 2.0. The weight and number average molecular weights may be determined by methods known to those skilled in the art.

The biodegradable polyesters may also have an apparent viscosity of from about 100 to about 1000 Pascal seconds (Pa·s), in some embodiments from about 200 to about 800 Pa·s, and in some embodiments, from about 300 to about 600 Pa·s, as determined at a temperature of 170° C. and a shear rate of 1000 sec$^{-1}$. The melt flow index of the biodegradable polyesters may also range from about 0.1 to about 10 grams per 10 minutes, in some embodiments from about 0.5 to about 8 grams per 10 minutes, and in some embodiments, from about 1 to about 5 grams per 10 minutes. The melt flow index is the weight of a polymer (in grams) that may be forced through an extrusion rheometer orifice (0.0825-inch diameter) when subjected to a load of 2160 grams in 10 minutes at a certain temperature (e.g., 190° C.), measured in accordance with ASTM Test Method D1238-E.

Of course, the melt flow index of the biodegradable polyesters will ultimately depend upon the selected film-forming process. For example, when extruded as a cast film, higher melt flow index polymers are typically desired, such as about 4 grams per 10 minutes or more, in some embodiments, from about 5 to about 12 grams per 10 minutes, and in some embodiments, from about 7 to about 9 grams per 10 minutes. Likewise, when formed as a blown film, lower melt flow index polymers are typically desired, such as less than about 12 grams per 10 minutes or less, in some embodiments from about 1 to about 7 grams per 10 minutes, and in some embodiments, from about 2 to about 5 grams per 10 minutes.

Examples of suitable biodegradable polyesters include aliphatic polyesters, such as polycaprolactone, polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aromatic polyesters and modified aromatic polyesters; and aliphatic-aromatic copolyesters. In one particular embodiment, the biodegradable polyester is an aliphatic-aromatic copolyester (e.g., block, random, graft, etc.). The aliphatic-aromatic copolyester may be synthesized using any known technique, such as through the condensation polymerization of a polyol in conjunction with aliphatic and aromatic dicarboxylic acids or anhydrides thereof. The polyols may be substituted or unsubstituted, linear or branched, polyols selected from polyols containing 2 to about 12 carbon atoms and polyalkylene ether glycols containing 2 to 8 carbon atoms. Examples of polyols that may be used include, but are not limited to, ethylene glycol, diethylene glycol, propylene glycol, 1,2-propanediol, 1,3-propanediol, 2,2-dimethyl-1,3-propanediol, 1,2-butanediol, 1,3-butanediol, 1,4-butanediol, 1,2-pentanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, cyclopentanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol.

Representative aliphatic dicarboxylic acids that may be used include substituted or unsubstituted, linear or branched, non-aromatic dicarboxylic acids selected from aliphatic dicarboxylic acids containing 1 to about 10 carbon atoms, and derivatives thereof. Non-limiting examples of aliphatic dicarboxylic acids include malonic, malic, succinic, oxalic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. Representative aromatic dicarboxylic acids that may be used include substituted and unsubstituted, linear or branched, aromatic dicarboxylic acids selected from aromatic dicarboxylic acids containing 1 to about 6 carbon atoms, and derivatives thereof. Non-limiting examples of aromatic dicarboxylic acids include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), etc., and mixtures thereof.

The polymerization may be catalyzed by a catalyst, such as a titanium-based catalyst (e.g., tetraisopropyltitanate, tetraisopropoxy titanium, dibutoxydiacetoacetoxy titanium, or tetrabutyltitanate). If desired, a diisocyanate chain extender may be reacted with the copolyester to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri- or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The copolyesters may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, 1,2,4-butanetriol, pentaerythritol, 1,2,6-hexanetriol, sorbitol, 1,1,4,4,-tetrakis(hydroxymethyl)cyclohexane, tris(2-hydroxyethyl) isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethane-tetracarboxylic acid, 1,1,2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

The aromatic dicarboxylic acid monomer constituent may be present in the copolyester in an amount of from about 10 mole % to about 40 mole %, in some embodiments from about 15 mole % to about 35 mole %, and in some embodiments, from about 15 mole % to about 30 mole %. The aliphatic dicarboxylic acid monomer constituent may likewise be present in the copolyester in an amount of from about 15 mole % to about 45 mole %, in some embodiments from about 20 mole % to about 40 mole %, and in some embodiments, from about 25 mole % to about 35 mole %. The polyol monomer constituent may also be present in the aliphatic-aromatic copolyester in an amount of from about 30 mole % to about 65 mole %, in some embodiments from about 40 mole % to about 50 mole %, and in some embodiments, from about 45 mole % to about 55 mole %.

In one particular embodiment, for example, the aliphatic-aromatic copolyester may comprise the following structure:

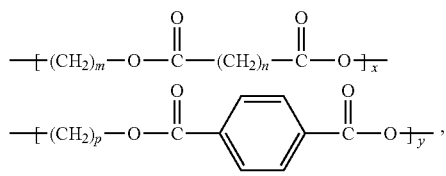

wherein, m is an integer from 2 to 10, in some embodiments from 2 to 4, and in an embodiment, 4;

n is an integer from 0 to 18, in some embodiments from 2 to 4, and in an embodiment, 4;

p is an integer from 2 to 10, in some embodiments from 2 to 4, and in an embodiment, 4;

x is an integer greater than 1; and y is an integer greater than 1.

One example of such a copolyester is polybutylene adipate terephthalate, which is commercially available under the designation ECOFLEX® F BX 7011 from BASF Corp. Another example of a suitable copolyester containing an aromatic terephthalic acid monomer constituent is available under the designation ENPOL™ 8060M from IRE Chemicals (South Korea). Other suitable aliphatic-aromatic copolyesters may be described in U.S. Pat. Nos. 5,292,783; 5,446,079; 5,559,171; 5,580,911; 5,599,858; 5,817,721; 5,900,322; and 6,258,924, which are incorporated herein in their entirety by reference thereto for all purposes.

iii. Polyolefin

A polyolefin may also be employed in the thermoplastic composition to help counteract the stiffness of the starch polymer, thereby improving ductility and melt processability of the resulting substrate. When employed, such polyolefins may constitute from about 10 wt. % to about 50 wt. %, in some embodiments from about 20 wt. % to about 45 wt. %, and in some embodiments, from about 25 wt. % to about 40 wt. % of the polymer content of the thermoplastic composition.

Exemplary polyolefins may include, for instance, polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin co-monomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from 0.85 to 0.96 grams per cubic centimeter ("g/cm$^3$"). Polyethylene "plastomers", for instance, may have a density in the range of from 0.85 to 0.91 g/cm$^3$. Likewise, "linear low density polyethylene" ("LLDPE") may have a density in the range of from 0.91 to 0.940 g/cm$^3$; "low density polyethylene" ("LDPE") may have a density in the range of from 0.910 to 0.940 g/cm$^3$; and "high density polyethylene" ("HDPE") may have density in the range of from 0.940 to 0.960 g/cm$^3$. Densities may be measured in accordance with ASTM 1505. Particularly suitable ethylene-based polymers for use in the present invention may be available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes.

Of course, the present invention is by no means limited to the use of ethylene polymers. For instance, propylene polymers may also be suitable for use as a semi-crystalline polyolefin. Suitable propylene polymers may include, for instance, polypropylene homopolymers, as well as copolymers or terpolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, and in some embodiments, from about 2 wt. % to about 10 wt. %. The density of the polypropylene (e.g., propylene/α-olefin copolymer) may be 0.95 grams per cubic centimeter (g/cm$^3$) or less, in some embodiments, from 0.85 to 0.92 g/cm$^3$, and in some embodiments, from 0.85 g/cm$^3$ to 0.91 g/cm$^3$. Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the polyolefins. For instance, olefin polymers may be formed using a free radical or a coordination catalyst (e.g., Ziegler-Natta or metallocene). Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S.

Pat. No. 5,272,236 to Lai et al.; and U.S. Pat. No. 6,090,325 to Wheat, et al., which are incorporated herein in their entirety by reference thereto for all purposes.

The melt flow index (MI) of the polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 2160 grams in 10 minutes at 190° C., and may be determined in accordance with ASTM Test Method D1238-E.

iv. Compatibilizer

To improve the compatibility and dispersion characteristics of starch polymers and polyolefins, when employed, a compatibilizer is employed in the thermoplastic composition. Typically, the compatibilizer constitutes from about 0.1 wt. % to about 15 wt. %, in some embodiments from about 0.5 wt. % to about 10 wt. %, and in some embodiments, from about 1 wt. % to about 5 wt. % of the composition. The compatibilizer generally possesses a polar component provided by one or more functional groups that are compatible with the starch polymer and a non-polar component provided by an olefin that is compatible with the polyolefin. The olefin component of the compatibilizer may generally be formed from any linear or branched α-olefin monomer, oligomer, or polymer (including copolymers) derived from an olefin monomer. For example, the compatibilizer may include polyethylene-co-vinyl acetate (EVA), polyethylene-co-vinyl alcohol (EVOH), polyethylene-co-acrylic (EAA), etc. in which the olefin component is provided by the polyethylene backbone. In other embodiment, the olefin component may be formed from an α-olefin monomer, which typically has from 2 to 14 carbon atoms and preferably from 2 to 6 carbon atoms. Examples of suitable monomers include, but not limited to, ethylene, propylene, butene, pentene, hexene, 2-methyl-1-propene, 3-methyl-1-pentene, 4-methyl-1-pentene, and 5-methyl-1-hexene. Examples of polyolefins include both homopolymers and copolymers, i.e., polyethylene, ethylene copolymers such as EPDM, polypropylene, propylene copolymers, and polymethylpentene polymers. An olefin copolymer can include a minor amount of non-olefinic monomers, such as styrene, vinyl acetate, diene, or acrylic and non-acrylic monomer. Functional groups may be incorporated into the polymer backbone using a variety of known techniques. For example, a monomer containing the functional group may be grafted onto a polyolefin backbone to form a graft copolymer. Such grafting techniques are well known in the art and described, for instance, in U.S. Pat. No. 5,179,164. In other embodiments, the monomer containing the functional groups may be copolymerized with an olefin monomer to form a block or random copolymer.

Regardless of the manner in which it is incorporated, the functional group of the compatibilizer may be any group that provides a polar segment to the molecule, such as a carboxyl group, acid anhydride group, amide group, imide group, carboxylate group, epoxy group, amino group, isocyanate group, group having oxazoline ring, hydroxyl group, and so forth. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series, and AMPLIFY™ GR Functional Polymers (maleic anhydride grafted polyolefins). In one particular embodiment, the compatibilizer is a graft copolymer of polyethylene and maleic anhydride having the structure shown below:

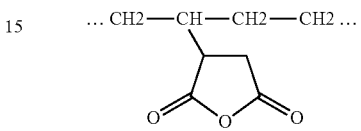

The cyclic anhydride at one end is chemically bonded directly into the polyethylene chain. The polar anhydride group of the molecule could, in one embodiment, associate with hydroxyl groups of a starch polymer via both hydrogen bonding and polar-polar molecular interactions and a chemical reaction to form an ester linkage during the melt extrusion process. The hydroxyls of the starch will undergo esterification reaction with the anhydride to achieve a ring-opening reaction to chemically link the starch polymer to the maleic anhydride to the grafted polyethylene. This reaction is accomplished under the high temperatures and pressures of the extrusion process.

v. Water-Soluble Polymer

If desired, the thermoplastic composition may also include one or more water-soluble polymers. Such polymers may be formed from monomers such as vinyl pyrrolidone, hydroxyethyl acrylate or methacrylate (e.g., 2-hydroxyethyl methacrylate), hydroxypropyl acrylate or methacrylate, acrylic or methacrylic acid, acrylic or methacrylic esters or vinyl pyridine, acrylamide, vinyl acetate, vinyl alcohol (hydrolyzed from vinyl acetate), ethylene oxide, derivatives thereof, and so forth. Other examples of suitable monomers are described in U.S. Pat. No. 4,499,154 to James, et al., which is incorporated herein in its entirety by reference thereto for all purposes. The resulting polymers may be homopolymers or interpolymers (e.g., copolymer, terpolymer, etc.), and may be nonionic, anionic, cationic, or amphoteric. In addition, the polymer may be of one type (i.e., homogeneous), or mixtures of different polymers may be used (i.e., heterogeneous). In one particular embodiment, the water-soluble polymer contains a repeating unit having a functional hydroxyl group, such as polyvinyl alcohol ("PVOH"), copolymers of polyvinyl alcohol (e.g., ethylene vinyl alcohol copolymers, methyl methacrylate vinyl alcohol copolymers, etc.), etc. Vinyl alcohol polymers, for instance, have at least two or more vinyl alcohol units in the molecule and may be a homopolymer of vinyl alcohol, or a copolymer containing other monomer units. Vinyl alcohol homopolymers may be obtained by hydrolysis of a vinyl ester polymer, such as vinyl formate, vinyl acetate, vinyl propionate, etc. Vinyl alcohol copolymers may be obtained by hydrolysis of a copolymer of a vinyl ester with an olefin having 2 to 30 carbon atoms, such as ethylene, propylene, 1-butene, etc.; an unsaturated carboxylic acid having 3 to 30 carbon atoms, such as acrylic acid, methacrylic acid, crotonic acid, maleic acid, fumaric acid, etc., or an ester, salt, anhydride or amide thereof; an unsaturated nitrile having 3 to 30 carbon atoms, such as acrylonitrile, methacrylonitrile, etc.; a vinyl ether having 3 to 30 carbon atoms, such as methyl vinyl ether, ethyl vinyl ether, etc.; and so forth. The degree of hydrolysis may be selected to optimize solubility, etc., of the polymer. For example, the degree of hydrolysis may be from about 60 mole % to about 95 mole %, in some embodiments from about 80 mole % to about 90 mole %, and in some embodiments, from about 85 mole % to about 89 mole %. Examples of suitable partially hydrolyzed polyvinyl alcohol polymers are available under the designation CELVOL™ 203, 205, 502, 504, 508, 513, 518, 523, 530, or 540 from Celanese Corp. Other suitable partially hydrolyzed polyvinyl alcohol polymers are available under the designation ELVANOL™ 50-14, 50-26, 50-42, 51-03, 51-04, 51-05, 51-08, and 52-22 from DuPont.

vi. Other Additives

Besides the components noted above, still other additives may also be incorporated into the composition, such as melt stabilizers, dispersion aids (e.g., surfactants), processing stabilizers, heat stabilizers, light stabilizers, antioxidants, heat aging stabilizers, whitening agents, antiblocking agents, bonding agents, lubricants, fillers, etc. For example, the composition may include a mineral filler, such as talc, calcium carbonate, magnesium carbonate, clay, silica, alumina, boron oxide, titanium oxide, cerium oxide, germanium oxide, etc. When employed, the mineral filler(s) typically constitute from about 0.01 wt. % to about 40 wt. %, in some embodiments from about 0.1 wt. % to about 30 wt. %, and in some embodiments, from about 0.5 wt. % to about 20 wt. % of the thermoplastic composition.

II. Melt Blending

As indicated above, the thermoplastic composition of the present invention is formed by melt blending together a starch polymer and plasticizer within an extruder. The components may be supplied separately or together to a feed section of the extruder (e.g., hopper) and/or a location downstream therefrom. Referring to FIG. 1, for example, one embodiment of an extruder 80 that may be employed for this purpose is illustrated. As shown, the extruder 80 contains a housing or barrel 114 and a screw 120 (e.g., barrier screw) rotatably driven on one end by a suitable drive 124 (typically including a motor and gearbox). If desired, a twin-screw extruder may be employed that contains two separate screws. The extruder 80 generally contains three sections: the feed section 132, the melt section 134, and the mixing section 136. The feed section 132 is the input portion of the barrel 114 where the polymeric material is added. The melt section 134 is the phase change section in which the plastic material is changed from a solid to a liquid. The mixing section 136 is adjacent the output end of the barrel 114 and is the portion in which the liquid plastic material is completely mixed. While there is no precisely defined delineation of these sections when the extruder is manufactured, it is well within the ordinary skill of those in this art to reliably identify the melt section 134 of the extruder barrel 114 in which phase change from solid to liquid is occurring.

A hopper 40 is also located adjacent to the drive 124 for supplying the biodegradable polymer and/or other materials through an opening 142 in the barrel 114 to the feed section 132. Opposite the drive 124 is the output end 144 of the extruder 80, where extruded plastic is output for further processing to form a film, which will be described in more detail below. A plasticizer supply station 150 is also provided on the extruder barrel 114 that includes at least one hopper 154, which is attached to a pump 160 to selectively provide the plasticizer through an opening 162 to the melt section 134. In this manner, the plasticizer may be mixed with the starch polymer in a consistent and uniform manner. Of course, in addition to or in lieu of supplying the plasticizer to the melt section 134, it should also be understood that it may be supplied to other sections of the extruder, such as the feed section 132 and/or the mixing section 136.

The pump 160 may be a high pressure pump (e.g., positive displacement pump) with an injection valve so as to provide a steady selected amount of plasticizer to the barrel 114. If desired, a programmable logic controller 170 may also be employed to connect the drive 124 to the pump 160 so that it provides a selected volume of plasticizer based on the drive rate of the screw 120. That is, the controller 170 may control the rate of rotation of the drive screw 120 and the pump 160 to inject the plasticizer at a rate based on the screw rotation rate. Accordingly, if the rotation rate of the screw 120 is increased to drive greater amounts of plastic through the barrel 114 in a given unit of time, the pumping rate of the pump 160 may be similarly increased to pump proportionately greater amounts of plasticizer into the barrel 114.

The plasticizer and starch polymer may be processed within the extruder 80 under shear and pressure and heat to ensure sufficient mixing. For example, melt processing may occur at a temperature of from about 75° C. to about 280° C., in some embodiments, from about 100° C. to about 250° C., and in some embodiments, from about 150° C. to about 200° C. Likewise, the apparent shear rate during melt processing may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

IV. Cooling System

Once formed, the melt blended composition generally flows through a die to form an extrudate, which may be in the form of a strand, sheet, film, etc. The extrudate is cooled upon exiting the die using the multi-stage system of the present invention, which includes at least one water-cooling stage and at least one air-cooling stage. More particularly, the extrudate is initially contacted with water for a certain period time so that it becomes partially cooled. The actual temperature of the water and the total time that it is in contact with the extrudate may vary depending on the extrusion conditions, the size of the extrudate, etc. For example, the temperature of the water is typically from about 10° C. to about 60° C., in some embodiments from about 15° C. to about 40° C., and in some embodiments, from about 20° C. to about 30° C. Likewise, the total time that water is in contact with the extrudate (or residence time) is typically small, such as from about 1 to about 10 seconds, in some embodiments from about 2 to about 8 seconds, and in some embodiments, from about 3 to about 6 seconds. If desired, multiple water cooling stages may be employed to achieve the desired degree of cooling. Regardless of the number of stages employed, the resulting water-cooled extrudate is typically at a temperature of from about 40° C. to about 100° C., in some embodiments from about 50° C. to about 80° C., and in some embodiments, from about 60° C. to about 70° C., and contains water in an amount of from about 2,000 to about 50,000 parts per million ("ppm"), in some embodiments from about 4,000 to about 40,000 ppm, and in some embodiments, from about 5,000 to about 30,000 ppm.

After the water-cooling stage(s), the extrudate is also subjected to at least one air-cooling stage in which a stream of air is placed into contact with the extrudate. The temperature of the air stream may vary depending on the temperature and moisture content of the water-cooled extrudate, but is typically from about 0° C. to about 40° C., in some embodiments from about 5° C. to about 35° C., and in some embodiments, from about 10° C. to about 30° C. If desired, multiple air-cooling stages may be employed to achieve the desired degree of cooling. Regardless of the number of stages employed, the total time that air is in contact with the extrudate (or residence time) is typically small, such as from about 1 to about 50 seconds, in some embodiments from about 2 to about 40 seconds, and in some embodiments, from about 3 to about 35 seconds. The resulting air-cooled extrudate is generally free of water and has a low moisture content, such as from about 500 to about 20,000 parts per million ("ppm") in some embodiments from about 800 to about 15,000 ppm, and in some embodiments, from about 1,000 to about 10,000 ppm. The temperature of the air-cooled extrudate may also be from about 15° C. to about 80° C., in some embodiments from about 20° C. to about 70° C., and in some embodiments, from about 25° C. to about 60° C.

Figure 2:
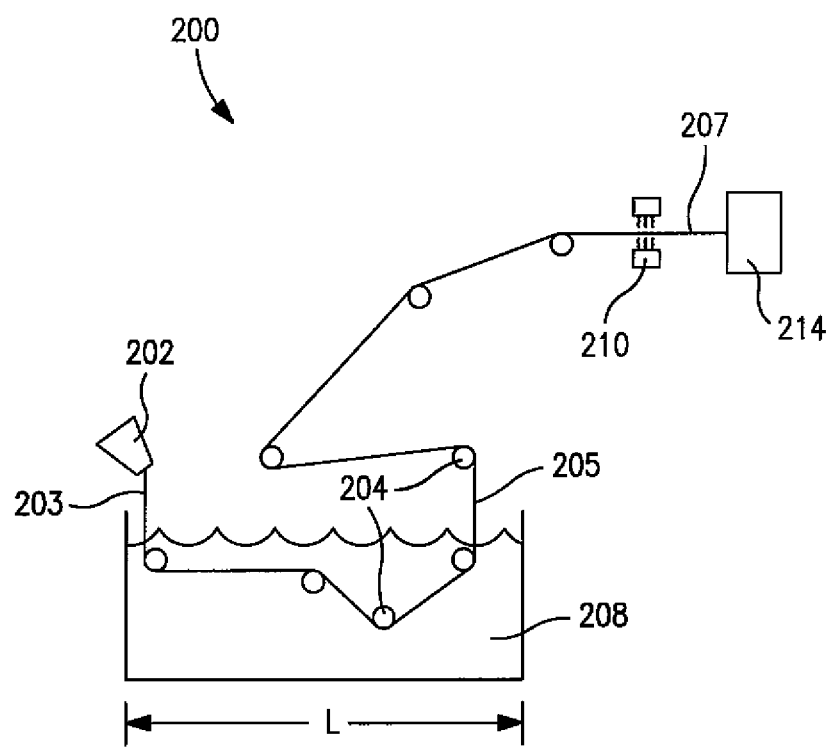
FIG. 2 is a schematic illustration of one embodiment of a system for cooling the thermoplastic composition that may be employed in the present invention.

The specific configuration of the multi-stage cooling system of the present invention may vary as would be understood by those skilled in the art. Referring to FIG. 2, for instance, one embodiment of the cooling system 200 is shown in more detail. In this particular configuration, the cooling system 200 employs a single water-cooling stage that involves the use of a liquid water bath 208 and also a single air-cooling stage that involves the use of an air knife 210. It should be understood that various other cooling techniques may also be employed for each stage. For example, rather than a liquid bath, water may be sprayed, coated, etc. onto a surface of the extrudate. Likewise, other techniques for contacting the extrudate with an air stream may include blowers, ovens, etc. In any event, in the embodiment illustrated in FIG. 2, the extrudate 203 is initially immersed within the water bath 208. As noted above, the rate of water cooling can be controlled by the temperature of the water bath 208 and the time that the extrudate 203 is immersed within the bath 208. In certain embodiments, the residence time of the extrudate 203 within the bath 208 can be adjusted by controlling the speed of rollers 204 over which the extrudate 203 traverses. Furthermore, the length "L" of the water bath 208 may also be adjusted to help achieve the desired residence time. For example, the length of the bath 208 may range from about 1 to about 30 feet, in some embodiments from about 2 to about 25 feet, and in some embodiments, from about 5 to about 15 feet. Likewise, the length "L$_1$" of the water bath through which the extrudate 203 is actually immersed is typically from about 0.5 to about 25 feet, in some embodiments from about 1 to about 20 feet, and in some embodiments, from about 2 to about 12 feet. After passing through the bath 208 for the desired period of time, the resulting water-cooled extrudate 205 then traverses over a series of rollers until it is placed into contact with an air stream provided by the air knife 210. If desired, the air-cooled extrudate 207 may then pass through a pelletizer 214 to form pellets for subsequent processing into a substrate. Alternatively, the air-cooled extrudate 207 may be processed into the desired substrate without first being formed into pellets.

V. Melt-Extruded Substrate

The thermoplastic composition of the present invention may be incorporated into any known melt-extruded substrate, such as films, nonwoven webs (e.g., spunbond webs, melt-blown webs, and so forth), etc. The substrate may contain a single layer or multiple layers and may also contain additional materials such that it is considered a composite. Regardless, in certain embodiments, the thermoplastic composition may constitute at least about 50 wt. %, in some embodiments from about 60 wt. % to about 99 wt. %, and in some embodiments, from about 75 to about 95 wt. % of the polymer content of the substrate. In other embodiments, other polymer(s), such as those described above, may be employed to impart certain properties to the substrate (e.g., strength, solubility, etc.). In such cases, the thermoplastic composition may constitute from about 10 wt. % to about 80 wt. %, in some embodiments from about 20 wt. % to about 70 wt. %, and in some embodiments, from about 30 to about 60 wt. % of the polymer content of the substrate, while such additional polymer(s) typically constitute from about 10 wt. % to about 80 wt. %, in some embodiments from about 20 wt. % to about 70 wt. %, and in some embodiments, from about 30 to about 60 wt. % of the polymer content of the substrate.

Various known techniques may be employed to form the melt-extruded substrate of the present invention. For example, a film may be formed by blowing, casting, flat die extruding, etc., a compounded material as is known in the art. In one particular embodiment, the film may be formed by a blown process in which a gas (e.g., air) is used to expand a bubble of the extruded polymer blend through an annular die. The bubble is then collapsed and collected in flat film form. Processes for producing blown films are described, for instance, in U.S. Pat. No. 3,354,506 to Raley; U.S. Pat. No. 3,650,649 to Schippers; and U.S. Pat. No. 3,801,429 to Schrenk et al., as well as U.S. Patent Application Publication Nos. 2005/0245162 to McCormack, et al. and 2003/0068951 to Boggs, et al., all of which are incorporated herein in their entirety by reference thereto for all purposes. In yet another embodiment, however, the film is formed using a casting technique.

Figure 3:
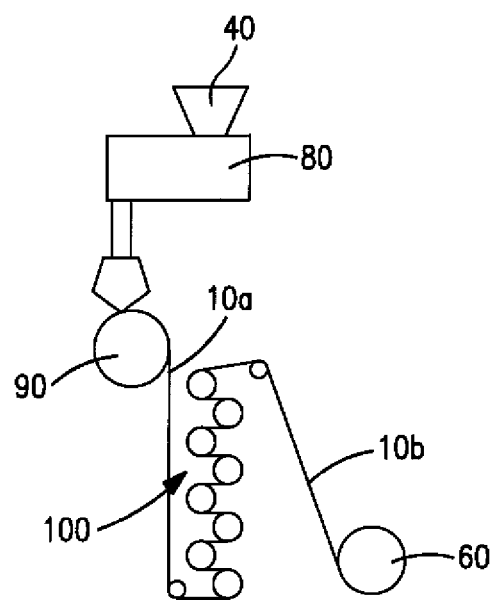
FIG. 3 is a schematic illustration of one embodiment of a method for forming a film in accordance with the present invention.

Referring to FIG. 3, for instance, one embodiment of a method for forming a cast film is shown. In this embodiment, the raw materials (not shown) are supplied to the extruder 80 in the manner described above and shown in FIG. 1, and then cast onto a casting roll 90 to form a single-layered precursor film 10a. If a multilayered film is to be produced, the multiple layers are co-extruded together onto the casting roll 90. The casting roll 90 may optionally be provided with embossing elements to impart a pattern to the film. Typically, the casting roll 90 is kept at temperature sufficient to solidify and quench the sheet 10a as it is formed, such as from about 20 to 60° C. If desired, a vacuum box may be positioned adjacent to the casting roll 90 to help keep the precursor film 10a close to the surface of the roll 90. Additionally, air knives or electrostatic pinners may help force the precursor film 10a against the surface of the casting roll 90 as it moves around a spinning roll. An air knife is a device known in the art that focuses a stream of air at a very high flow rate to pin the edges of the film.

Once cast, the film 10a may then be optionally oriented in one or more directions to further improve film uniformity and reduce thickness. Orientation may also form micropores in a film containing a filler, thus providing breathability to the film. For example, the film may be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" oriented film may then be laminated to a fibrous web. In addition, the uniaxially oriented film may also be oriented in the cross-machine direction to form a "biaxially oriented" film. For example, the film may be clamped at its lateral edges by chain clips and conveyed into a tenter oven. In the tenter oven, the film may be reheated and drawn in the cross-machine direction to the desired draw ratio by chain clips diverged in their forward travel.

Referring again to FIG. 3, for instance, one method for forming a uniaxially oriented film is shown. As illustrated, the precursor film 10a is directed to a film-orientation unit 100 or machine direction orienter ("MDO"), such as commercially available from Marshall and Willams, Co. of Providence, R.I. The MDO has a plurality of stretching rolls (such as from 5 to 8) which progressively stretch and thin the film in the machine direction, which is the direction of travel of the film through the process as shown in FIG. 3. While the MDO 100 is illustrated with eight rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 100 may act as preheat rolls. If present, these first few rolls heat the film 10a above room temperature (e.g., to 125° F.). The progressively faster speeds of adjacent rolls in the MDO act to stretch the film 10a. The rate at which the stretch rolls rotate determines the amount of stretch in the film and final film weight.

The resulting film 10b may then be wound and stored on a take-up roll 60. While not shown here, various additional potential processing and/or finishing steps known in the art, such as slitting, treating, aperturing, printing graphics, or lamination of the film with other layers (e.g., nonwoven web materials), may be performed without departing from the spirit and scope of the invention.

The film may be mono- or multi-layered. Multilayer films may be prepared by co-extrusion of the layers, extrusion coating, or by any conventional layering process. For example, the film may contain from two (2) to fifteen (15) layers, and in some embodiments, from three (3) to twelve (12) layers. Such multilayer films normally contain at least one base layer and at least one skin layer, but may contain any number of layers desired. For example, the multilayer film may be formed from a base layer and one or more skin layers, wherein the base layer is formed from the thermoplastic composition of the present invention. In most embodiments, the skin layer(s) are formed from a thermoplastic composition such as described above. It should be understood, however, that other polymers may also be employed in the skin layer(s), such as polyolefin polymers (e.g., linear low-density polyethylene (LLDPE) or polypropylene).

The thickness of the film of the present invention may be relatively small to increase flexibility. For example, the film may have a thickness of about 50 micrometers or less, in some embodiments from about 1 to about 40 micrometers, in some embodiments from about 2 to about 35 micrometers, and in some embodiments, from about 5 to about 30 micrometers. Despite having such a small thickness, the film is nevertheless able to retain good mechanical properties during use. One parameter that is indicative of the relative dry strength of the film is the ultimate tensile strength, which is equal to the peak stress obtained in a stress-strain curve, such as obtained in accordance with ASTM Standard D638-08. Desirably, the film of the present invention exhibits a peak stress (when dry) in the machine direction ("MD") of from about 10 to about 100 Megapascals (MPa), in some embodiments from about 15 to about 70 MPa, and in some embodiments, from about 20 to about 60 MPa, and a peak stress in the cross-machine direction ("CD") of from about 5 to about 40 Megapascals (MPa), in some embodiments from about 10 to about 40 MPa, and in some embodiments, from about 15 to about 30 MPa.

Although possessing good strength, the film is relatively ductile. One parameter that is indicative of the ductility of the film is the percent strain of the film at its break point, as determined by the stress strain curve, such as obtained in accordance with ASTM Standard D608-08. For example, the percent strain at break of the film in the machine direction may be about 100% or more, in some embodiments about 300% or more, and in some embodiments, from about 400% to about 600%. Likewise, the percent strain at break of the film in the cross-machine direction may be about 400% or more, in some embodiments about 550% or more, and in some embodiments, from about 600% to about 800%. Another parameter that is indicative of ductility is the modulus of elasticity of the film, which is equal to the ratio of the tensile stress to the tensile strain and is determined from the slope of a stress-strain curve. For example, the film typically exhibits a modulus of elasticity (when dry) in the machine direction ("MD") of from about 40 to about 400 Megapascals ("MPa"), in some embodiments from about 50 to about 200 MPa, and in some embodiments, from about 60 to about 80 MPa, and a modulus in the cross-machine direction ("CD") of from about 50 to about 400 Megapascals ("MPa"), in some embodiments from about 80 to about 250 MPa, and in some embodiments, from about 100 to about 200 MPa.

If desired, the film may be laminated to one or more nonwoven web facings to reduce the coefficient of friction and enhance the cloth-like feel of the composite surface. Exemplary polymers for use in forming nonwoven web facings may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. If desired, biodegradable polymers, such as those described above, may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

Monocomponent and/or multicomponent fibers may be used to form the nonwoven web facing. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. Multicomponent fibers having various irregular shapes may also be formed.

Fibers of any desired length may be employed, such as staple fibers, continuous fibers, etc. In one particular embodiment, for example, staple fibers may be used that have a fiber length in the range of from about 1 to about 150 millimeters, in some embodiments from about 5 to about 50 millimeters, in some embodiments from about 10 to about 40 millimeters, and in some embodiments, from about 10 to about 25 millimeters. Although not required, carding techniques may be employed to form fibrous layers with staple fibers as is well known in the art. For example, fibers may be formed into a carded web by placing bales of the fibers into a picker that separates the fibers. Next, the fibers are sent through a combing or carding unit that further breaks apart and aligns the fibers in the machine direction so as to form a machine direction-oriented fibrous nonwoven web. The carded web may then be bonded using known techniques to form a bonded carded nonwoven web.

If desired, the nonwoven web facing used to form the nonwoven composite may have a multi-layer structure. Suitable multi-layered materials may include, for instance, spunbond/meltblown/spunbond (SMS) laminates and spunbond/meltblown (SM) laminates. Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above. A nonwoven web facing may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven web. The fibrous component of the composite may contain any desired amount of the resulting substrate.

The basis weight of the nonwoven web facing may generally vary, such as from about 5 grams per square meter ("gsm") to 120 gsm, in some embodiments from about 8 gsm to about 70 gsm, and in some embodiments, from about 10 gsm to about 35 gsm. When using multiple nonwoven web facings, such materials may have the same or different basis weights.

VI. Applications

The melt-extruded substrate may be used in a wide variety of applications, such as a packaging film, such as an individual wrap, packaging pouch, or bag for the disposal of a variety of articles, such as food products, paper products (e.g., tissue, wipes, paper towels, etc.), absorbent articles, etc. Various suitable pouch, wrap, or bag configurations for absorbent articles are disclosed, for instance, in U.S. Pat. No. 6,716,203 to Sorebo, et al. and U.S. Pat. No. 6,380,445 to Moder, et al., as well as U.S. Patent Application Publication No. 2003/0116462 to Sorebo, et al., all of which are incorporated herein in their entirety by reference thereto for all purposes.

The melt-extruded substrate may also be employed in other applications. For example, the film may be used in an absorbent article. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins, pantiliners, etc.), swim wear, baby wipes, and so forth; medical absorbent articles, such as garments, fenestration materials, underpads, bedpads, bandages, absorbent drapes, and medical wipes; food service wipers; clothing articles; and so forth. Several examples of such absorbent articles are described in U.S. Pat. No. 5,649,916 to DiPalma, et al.; U.S. Pat. No. 6,110,158 to Kielpikowski; U.S. Pat. No. 6,663,611 to Blaney, et al., which are incorporated herein in their entirety by reference thereto for all purposes. Still other suitable articles are described in U.S. Patent Application Publication No. 2004/0060112 A1 to Fell et al., as well as U.S. Pat. No. 4,886,512 to Damico et al.; U.S. Pat. No. 5,558,659 to Sherrod et al.; U.S. Pat. No. 6,888,044 to Fell et al.; and U.S. Pat. No. 6,511,465 to Freiburger et al., all of which are incorporated herein in their entirety by reference thereto for all purposes. Materials and processes suitable for forming such absorbent articles are well known to those skilled in the art.

In this regard, one particular embodiment of a sanitary napkin that may employ the film of the present invention will now be described in more detail. For purposes of illustration only, an absorbent article can be a sanitary napkin for feminine hygiene. In such an embodiment, the absorbent article includes a main body portion containing a topsheet, an outer cover or backsheet, an absorbent core positioned between the backsheet and the topsheet, and a pair of flaps extending from each longitudinal side of the main body portion. The topsheet defines a bodyfacing surface of the absorbent article. The absorbent core is positioned inward from the outer periphery of the absorbent article and includes a body-facing side positioned adjacent the topsheet and a garment-facing surface positioned adjacent the backsheet. In one particular embodiment of the present invention, the backsheet is a film formed from the thermoplastic composition of the present invention and is generally liquid-impermeable and optionally vapor-permeable. The film used to form the backsheet may also be laminated to one or more nonwoven web facings such as described above.

The topsheet is generally designed to contact the body of the user and is liquid-permeable. The topsheet may surround the absorbent core so that it completely encases the absorbent article. Alternatively, the topsheet and the backsheet may extend beyond the absorbent core and be peripherally joined together, either entirely or partially, using known techniques. Typically, the topsheet and the backsheet are joined by adhesive bonding, ultrasonic bonding, or any other suitable joining method known in the art. The topsheet is sanitary, clean in appearance, and somewhat opaque to hide bodily discharges collected in and absorbed by the absorbent core. The topsheet further exhibits good strike-through and rewet characteristics permitting bodily discharges to rapidly penetrate through the topsheet to the absorbent core, but not allow the body fluid to flow back through the topsheet to the skin of the wearer. For example, some suitable materials that may be used for the topsheet include nonwoven materials, perforated thermoplastic films, or combinations thereof. A nonwoven fabric made from polyester, polyethylene, polypropylene, bicomponent, nylon, rayon, or like fibers may be utilized. For instance, a white uniform spunbond material is particularly desirable because the color exhibits good masking properties to hide menses that has passed through it. U.S. Pat. No. 4,801,494 to Datta, et al. and U.S. Pat. No. 4,908,026 to Sukiennik, et al. teach various other cover materials that may be used in the present invention.

The topsheet may also contain a plurality of apertures (not shown) formed therethrough to permit body fluid to pass more readily into the absorbent core. The apertures may be randomly or uniformly arranged throughout the topsheet, or they may be located only in the narrow longitudinal band or strip arranged along the longitudinal axis of the absorbent article. The apertures permit rapid penetration of body fluid down into the absorbent core. The size, shape, diameter and number of apertures may be varied to suit one's particular needs.

The absorbent article also contains an absorbent core positioned between the topsheet and the backsheet. The absorbent core may be formed from a single absorbent member or a composite containing separate and distinct absorbent members. It should be understood, however, that any number of absorbent members may be utilized in the present invention. For example, in an embodiment, the absorbent core may contain an intake member (not shown) positioned between the topsheet and a transfer delay member (not shown). The intake member may be made of a material that is capable of rapidly transferring, in the z-direction, body fluid that is delivered to the topsheet. The intake member may generally have any shape and/or size desired. In one embodiment, the intake member has a rectangular shape, with a length equal to or less than the overall length of the absorbent article, and a width less than the width of the absorbent article. For example, a length of between about 150 mm to about 300 mm and a width of between about 10 mm to about 60 mm may be utilized.

Any of a variety of different materials may be used for the intake member to accomplish the above-mentioned functions. The material may be synthetic, cellulosic, or a combination of synthetic and cellulosic materials. For example, airlaid cellulosic tissues may be suitable for use in the intake member. The airlaid cellulosic tissue may have a basis weight ranging from about 10 grams per square meter (gsm) to about 300 gsm, and in some embodiments, between about 100 gsm to about 250 gsm. In one embodiment, the airlaid cellulosic tissue has a basis weight of about 200 gsm. The airlaid tissue may be formed from hardwood and/or softwood fibers. The airlaid tissue has a fine pore structure and provides an excellent wicking capacity, especially for menses.

If desired, a transfer delay member (not shown) may be positioned vertically below the intake member. The transfer delay member may contain a material that is less hydrophilic than the other absorbent members, and may generally be characterized as being substantially hydrophobic. For example, the transfer delay member may be a nonwoven fibrous web composed of a relatively hydrophobic material, such as polypropylene, polyethylene, polyester or the like, and also may be composed of a blend of such materials. One example of a material suitable for the transfer delay member is a spunbond web composed of polypropylene, multi-lobal fibers. Further examples of suitable transfer delay member materials include spunbond webs composed of polypropylene fibers, which may be round, tri-lobal or poly-lobal in cross-sectional shape and which may be hollow or solid in structure. Typically the webs are bonded, such as by thermal bonding, over about 3% to about 30% of the web area. Other examples of suitable materials that may be used for the transfer delay member are described in U.S. Pat. No. 4,798,603 to Meyer, et al. and U.S. Pat. No. 5,248,309 to Serbiak, et al. To adjust the performance of the invention, the transfer delay member may also be treated with a selected amount of surfactant to increase its initial wettability.

The transfer delay member may generally have any size, such as a length of about 150 mm to about 300 mm. Typically, the length of the transfer delay member is approximately equal to the length of the absorbent article. The transfer delay member may also be equal in width to the intake member, but is typically wider. For example, the width of the transfer delay member may be from between about 50 mm to about 75 mm, and particularly about 48 mm. The transfer delay member typically has a basis weight less than that of the other absorbent members. For example, the basis weight of the transfer delay member is typically less than about 150 grams per square meter (gsm), and in some embodiments, between about 10 gsm to about 100 gsm. In one particular embodiment, the transfer delay member is formed from a spunbonded web having a basis weight of about 30 gsm.

Besides the above-mentioned members, the absorbent core may also include a composite absorbent member (not shown), such as a coform material. In this instance, fluids may be wicked from the transfer delay member into the composite absorbent member. The composite absorbent member may be formed separately from the intake member and/or transfer delay member, or may be formed simultaneously therewith. In one embodiment, for example, the composite absorbent member may be formed on the transfer delay member or intake member, which acts a carrier during the coform process described above.

Although various configurations of an absorbent article have been described above, it should be understood that other configurations are also included within the scope of the present invention. Further, the present invention is by no means limited to backsheets and the film of the present invention may be incorporated into a variety of different components of an absorbent article. For example, a release liner of an absorbent article may include the film of the present invention.

The present invention may be better understood with reference to the following examples.

Test Methods

Tensile Properties

Films were tested for tensile properties (peak stress, modulus, strain at break, and energy per volume at break) on a Sintech 1/D tensile frame. The test was performed in accordance with ASTM D638-08. Film samples were cut into dog bone shapes with a center width of 3.0 mm before testing. The dog-bone film samples were held in place using grips on the Sintech device with a gauge length of 18.0 mm. The film samples were stretched at a crosshead speed of 5.0 in/min until breakage occurred. Five samples were tested for each film in both the machine direction (MD) and the cross direction (CD). A computer program called TestWorks 4 was used to collect data during testing and to generate a stress versus strain curve from which a number of properties were determined, including modulus, peak stress, elongation, and energy to break.

Melt Flow Index

The melt flow index was determined in accordance with ASTM D-1238 at a temperature of 190° C., load of 2.16 kg, and release time of 6 minutes. A Model MP600 melt indexer at Tinius Olsen Testing Machine Company, Inc. was used to measure the melt flow rates.

Moisture Analysis

The moisture content was determined using a "loss on drying" method via a Compurac® moisture analyzer made from Arizona Instrument. More particularly, the initial weight of the sample was measured. This sample was then placed in oven at 130° C. to eliminate the water, cooled to ambient temperature, and reweighed. The moisture content may be determined as parts per million ("ppm") or weight percentage (wt. %) as follows.

Moisture content (ppm)=[(Initial mass−Final mass)/Initial mass]*1,000,000

Moisture content (wt. %)=[(Initial mass−Final mass)/Initial mass]*100

Materials Employed

The following materials were employed in the Examples:
Cargill gel corn starch was purchased from Cargill (Cedar Rapids, Iowa);
Glycerin (Emery™ 916) was purchased from Cognis Corporation (Cincinnati, Ohio);
ECOFLEX™ F BX 7011, an aliphatic aromatic copolyester, was purchased from BASF (Ludwigshafen, Germany);
DOWLEX™ EG 2244G polyethylene resin was purchased from Dow Chemical Company (Midland, Mich.); and
FUSABOND® MB 528D, a chemically modified polyethylene resin, was purchased from DuPont Company (Wilmington, Del.).

Equipment Employed

ZSK-30 Extruder

The ZSK-30 extruder (Werner and Pfleiderer Corporation, Ramsey, N.J.) is a co-rotating, twin screw extruder, with a diameter of 30 mm and screw length up to 1328 mm. The extruder has 14 barrels. The first barrel received the mixture of starch, Ecoflex® copolyesters, polyolefins, compatibilizers, additives, etc. When glycerin injection was used, it was injected into barrel 2 with a pressurized injector connected with an Eldex pump (Napa, Calif.). The vent was opened at the end of the extruder to release moisture.

HAAKE Rheomex 252

The Haake Rheomex 252 (Haake, Karlsruhe, Germany) is a single screw extruder with a diameter of 18.75 mm and a screw length of 450 mm.

HAAKE Rheocord 90

The Haake Rheocord 90 (Haake, Karlsruhe, Germany) is a computer controlled torque rheometer. It is utilized for controlling rotor speed and temperature settings on the HAAKE Rheomex 252.

Examples 1-3

A thermoplastic composition was formed from 25 wt. % thermoplastic starch (corn starch and glycerin), 34 wt. % DOWLEX™ EG 2244G polyethylene, 3 wt. % FUSABOND™ MB 528D, and 38 wt. % ECOFLEX™ F BX 7011. Feeding of the corn starch was accomplished using a ZSK-30 twin screw powder feeder at the rate of 7.5 lbs/hour. Glycerin was used to fill 5 gallon pails and heated prior to resin blending. The glycerin was pumped directly into the melt-stream of the extruder using a three head liquid pump at approximately 18.9 g/min, equating to 2.5 lbs/hr. DOWLEX™ polyethylene ("PE") was measured into a 5 gallon pail and hand mixed with FUSABOND™ 528 ("FB"). The mixture was fed into the throat of the extruder at a rate of 14.68 lbs/hr via a single screw pellet feeder. ECOFLEX™ copolyester was fed into the throat using a single screw feeder at a rate of 15 lbs/hr.

The resulting strands were cooled in a water bath with varying water exposure lengths (5 feet, 10 feet, or 15 feet). The cool strands were collected on a cardboard sheet and then shredded into pellets for further processing. A comparative example ("Comp. Ex.") was also formed in a manner as described above, except that the strands were only air cooled on a belt by a series of fans located above the belt.

The processing conditions for the samples are set forth below in Table 1.

TABLE 1

| | | | | | | Process Conditions | | | | | | | | |
|---|---|---|---|---|---|---|---|---|---|---|---|---|---|---|
| Ex. | Cooling Method | Starch (lb/hr) | PE/FB (lb/hr) | Ecoflex™ (lb/hr) | Pump (lb/hr) | Speed (rpm) | T1 (° C.) | T2 (° C.) | T3 (° C.) | T4 (° C.) | T5 (° C.) | T6 (° C.) | T7 (° C.) | Torque (%) |
| Comp. Ex. | Air | 7.5 | 14.7 | 15 | 2.5 | 350 | 90 | 140 | 162 | 163 | 163 | 150 | 140 | 52-55 |
| 1 | 5 ft. water | 7.5 | 14.7 | 15 | 2.5 | 330 | 90 | 138 | 164 | 161 | 163 | 149 | 145 | 65-69 |
| 2 | 10 ft. water | | | | | | | | | | | | | |
| 3 | 15 ft. water | | | | | | | | | | | | | |

After being submerged in the 5 ft. water dip, the strands of Example 1 were too soft and ductile to be pelletized because they did not fully cool. In Examples 2 and 3, the cooling was sufficient to allow the strands to cool and continuous pelletization was possible.

Films were cast using a Haake Rheomex 252 connected to a Haake Rheocord 90, which was responsible for monitoring and adjusting torque, screw speed, and heating. Pellets obtained from the ZSK-30 extruder were flood fed into the Haake extruder for film casting. The pellets had a moisture content of about 3,000 to 3,7000 ppm (no issues encountered during film extrusion at this moisture level). An 8-inch film die was used in conjunction with a cooled roller and collection system to obtain a film having a thickness of approximately 25.4 micrometers. The casting conditions are summarized in Table 2 below.

TABLE 2

| | Casting Conditions | | | | | | | | | |
|---|---|---|---|---|---|---|---|---|---|---|
| | Extrusion | | | | | | | | Take Up | | Water |
| Ex. | Speed (rpm) | T1 (° C.) | T2 (° C.) | T3 (° C.) | T4 (° C.) | T5 (° C.) | Tm (° C.) | Torque | Melt pump | Roll speed (rpm) | Content (ppm) |
| 1 | 60 | 160 | 180 | 190 | 180 | 140 | 189 | 2546 | 500 | 650 | 3732 |
| 2 | 60 | 160 | 180 | 190 | 180 | 140 | 185 | 2500 | 500 | 650 | 3398 |
| 3 | 60 | 160 | 180 | 190 | 180 | 140 | 184 | 2500 | 500 | 650 | 3007 |

The resulting films were stored in a standard state conditioning room overnight and tested for tensile properties as indicated above. The MD and CD properties for the films are set forth below in Tables 3-4.

TABLE 3

MD Tensile Properties

| Ex. | Film Thickness (μm) | Peak Stress (MPa) | Modulus (MPa) | Strain @ Break (%) | Energy per Volume @ Break (J/cm³) |
|---|---|---|---|---|---|
| Comp. Ex. 1 | 27.9 | 35 | 58 | 398 | 85 |
| 1 | 27.9 | 38 | 87 | 427 | 96 |
| 2 | 33.0 | 38 | 59 | 464 | 107 |
| 3 | 27.9 | 40 | 97 | 407 | 102 |

TABLE 4

CD Tensile Properties

| Ex. | Film Thickness (μm) | Peak Stress (MPa) | Modulus (MPa) | Strain @ Break (%) | Energy per Volume @ Break (J/cm³) |
|---|---|---|---|---|---|
| Comp. Ex. 1 | 24.1 | 12 | 69 | 493 | 40 |
| 1 | 27.9 | 21 | 132 | 693 | 90 |
| 2 | 33.0 | 20 | 114 | 648 | 79 |
| 3 | 27.9 | 18 | 127 | 614 | 72 |

As indicated, the CD peak stress, ductility, and energy at break for the water- and air-cooled films of Examples 1-3 was significantly higher than the just air-cooled film of the Comparative Example.

Example 4

The ability to form a thermoplastic composition using the process of the present invention was demonstrated. More particularly, the composition was formed from 19 wt. % corn starch, 6 wt. % glycerin, 34 wt. % DOWLEX™ EG 2244G polyethylene, 3 wt. % FUSABOND™ MB 528D, and 38 wt. % ECOFLEX™ F BX 7011. The DOWLEX™ EG 2244G polyethylene, FUSABOND™ MB 528D, and ECOFLEX™ F BX 7011 were initially dry mixed and then fed to a 64-mm co-rotating, twin screw extruder (L/D ratio=38) at a rate of 375 pounds per hour. The extruder had one feed barrel (Zone 1), six closed barrels (Zones 2-7), and finally a barrel with a vacuum stack (Zone 8). The polymer mixture was supplied to the feed barrel via a twin screw gravimetric feeder (Arbo Flat Tray Feeder). The corn starch was also fed to the feed barrel via a gravimetric feeder (Accurate Feeder) at a rate of 95 pounds per hour. Glycerin was pumped directly into the feed barrel of the extruder using a liquid gear pump at approximately 30 lbs/hr. A 12-strand die with a diameter of 0.125 inches was used to form strands from the composition. The resulting strands were cooled as shown in FIG. 2. More particularly, the strands were submerged in a water bath with an exposure length of approximately 7 feet in which water is being circulated to maintain a cool water temperature. Multiple passes of strands and an air knife were employed to ensure the adequate cooling and eliminate the moisture on the surface of strands prior to pelletization. The cooled strands were pelletized and collected in a drum.

Films were cast using a Haake Rheomex 252 connected to a Haake Rheocord 90, which was responsible for monitoring and adjusting torque, screw speed, and heating. Pellets obtained from the ZSK-30 extruder were flood fed into the Haake extruder for film casting. An 8-inch film die was used in conjunction with a cooled roller and collection system to obtain a film having a thickness of approximately 25.4 micrometers. The processing conditions are summarized in Table 5 below.

TABLE 5

| | Extrusion Conditions | | | | | | | | | | | |
|---|---|---|---|---|---|---|---|---|---|---|---|---|
| | Extrusion | | | | | | | | | Die | Melt | Water |
| | Feed Rate (lb/hr) | Speed (rpm) | T1 (° F.) | T2 (° F.) | T3 (° F.) | T4 (° F.) | T5 (° F.) | T6 (° F.) | T7 (° F.) | T8 (° F.) | Body (° F.) | Temp. (° F.) | Bath (° F.) |
| Set Point | 500 | — | 100 | 195 | 285 | 330 | 330 | 330 | 330 | 300 | 300 | — | — |
| After 45 min | 500 | 250 | 102 | 195 | 286 | 283 | 323 | 331 | 333 | 298 | 307 | 336 | 78 |
| After 120 min | 500 | 250 | 100 | 195 | 283 | 360 | 330 | 329 | 330 | 303 | 308 | 331 | 77 |

As indicated, the extrusion and die temperatures were quite stable, except that Zone 4 fluctuated in temperature from 283° F. to 360° F. The resin produced in this example was also evaluated for moisture content and melt flow index in the manner described above. The moisture content was 8860 ppm and the melt flow index was 2.13 grams per 10 minutes (190° C., 2.16 kg load).

Example 5

Other samples were blended by changing the screw speed with the same processing conditions as described in Example 4. The processing conditions are summarized in Table 6 below.

TABLE 6

| | Casting Conditions | | | | | | | | | | | | |
|---|---|---|---|---|---|---|---|---|---|---|---|---|---|
| | Extrusion | | | | | | | | | | Die | Melt | Water |
| | Feed Rate (lb/hr) | Speed (rpm) | T1 (° F.) | T2 (° F.) | T3 (° F.) | T4 (° F.) | T5 (° F.) | T6 (° F.) | T7 (° F.) | T8 (° F.) | Body (° F.) | Temp. (° F.) | Bath (° F.) |
| Set Point | 500 | — | 100 | 195 | 285 | 330 | 330 | 330 | 300 | 300 | 300 | — | — |
| After 45 min | 500 | 330 | 102 | 196 | 284 | 285 | 323 | 340 | 375 | 304 | 314 | — | 81 |
| After 180 min | 500 | 249 | 101 | 200 | 285 | 283 | 330 | 337 | 359 | 303 | 311 | 444 | 78 |
| After 220 min | 500 | 249 | 100 | 195 | 285 | 331 | 330 | 330 | 362 | 300 | 316 | 444 | 76 |
| After 260 min | 500 | 249 | 100 | 195 | 284 | 342 | 330 | 329 | 361 | 299 | 299 | 444 | 77 |

As indicated in Table 6, extrusion temperatures were higher than those of Example 4. The temperature of die body was high in the early stages because of a higher screw speed, 330 rpm. After reducing the screw speed to 250 rpm, the temperature of the die body was slowly cooled down to the set point. The resin produced in this example was also evaluated for moisture content and melt flow index at run times of 60 minutes, 90 minutes, and 120 minutes. The moisture content was 4000 ppm at 60 minutes, 2600 ppm at 90 minutes, and 4378 at 120 minutes. The melt flow index was 0.28 g/10 min at 60 minutes, 0.18 g/10 min at 90 minutes, and 0.31 g/10 min at 120 minutes.

Example 6

Films were cast from samples of Examples 4 and 5 using a Haake Rheomex 252 connected to a Haake Rheocord 90, which was responsible for monitoring and adjusting torque, screw speed, and heating. Pellets obtained from the twin screw extrusion process were flood fed into the Haake extruder for film casting. An 8-inch film die was used in conjunction with a cooled roller and collection system to obtain a film having a thickness of approximately 25.4 micrometers. The casting conditions are summarized in Table 7 below.

TABLE 7

| | Film Casting Conditions | | | | | |
|---|---|---|---|---|---|---|
| | Extrusion | | | | | |
| Ex. | Speed (rpm) | T1 (° C.) | T2 (° C.) | T3 (° C.) | Die Temp (° C.) | Tm (° C.) | Torque |
| 4 | 50 | 160 | 185 | 185 | 170 | 185 | 8-9 |
| 5 | 50 | 160 | 185 | 185 | 170 | 182 | 10-11 |

The resulting films were stored in a standard state conditioning room overnight and tested for tensile properties as indicated above. The mean MD and CD properties for the films are set forth below in Tables 8-9.

TABLE 8

| | MD Tensile Properties | | | | |
|---|---|---|---|---|---|
| Ex. | Film Thickness (μm) | Peak Stress (MPa) | Modulus (MPa) | Strain @ Break (%) | Energy per Volume @ Break (J/cm³) |
| 4 | 29.5 | 45.2 | 126.1 | 462.7 | 113.3 |
| 5 | 35.6 | 22.8 | 121.2 | 238.8 | 37.8 |

TABLE 9

| | CD Tensile Properties | | | | |
|---|---|---|---|---|---|
| Ex. | Film Thickness (μm) | Peak Stress (MPa) | Modulus (MPa) | Strain @ Break (%) | Energy per Volume @ Break (J/cm³) |
| 4 | 31.2 | 19.7 | 94.2 | 712.5 | 67.8 |
| 5 | 33.3 | 7.4 | 103.5 | 363.8 | 21.3 |

As indicated, the MD/CD peak stress and elongation values of Example 4 were quite high. Example 5 showed lower stress and elongation values than Example 4, which is believed to be due to holes formed in the film during casting due to unintended starch degradation during extrusion.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for forming a thermoplastic starch-based composition, the method comprising:
   melt extruding a thermoplastic composition through a die to form an extrudate, wherein the thermoplastic composition comprises a starch polymer and a plasticizer, wherein the plasticizer is a polyhydric alcohol or a sugar alcohol;
   subjecting the extrudate to at least one water-cooling stage in which the extrudate is contacted with water for a first period of time; and
   thereafter, subjecting the water-cooled extrudate to at least one air-cooling stage in which the extrudate is contacted with air for a second period of time, wherein the air-cooled extrudate has a moisture content of from about 1,000 to about 10,000 parts per million, wherein a film formed from the thermoplastic starch-based composition exhibits a percent strain at break in the cross-machine direction of about 550% or more.

2. The method of claim 1, wherein the first period of time is from about 1 to about 50 seconds.

3. The method of claim 1, wherein the temperature of the water is from about 10° C. to about 60° C.

4. The method of claim 1, wherein the extrudate is immersed within a water cooling device during the water-cooling stage.

5. The method of claim 1, wherein the second period of time is from about 1 to about 50 seconds.

6. The method of claim 1, wherein the temperature of the stream of air is from about 0° C. to about 40° C.

7. The method of claim 1, wherein the stream of air is provided by an air knife.

8. The method of claim 1, further comprising pelletizing the air-cooled extrudate.

9. The method of claim 1, wherein the starch polymer is a corn starch.

10. The method of claim 1, wherein the weight ratio of starch polymers to plasticizers in the thermoplastic composition is from about 1 to about 10.

11. The method of claim 1, further comprising melt-extruding the air-cooled extrudate onto a surface to form a substrate.

12. A method for forming a thermoplastic starch-based composition, the method comprising:
melt extruding a thermoplastic composition through a die to form an extrudate, wherein the thermoplastic composition comprises a starch polymer, a plasticizer, wherein the plasticizer is a polyhydric alcohol or sugar alcohol, a biodegradable polymer, a polyolefin, and a compatibilizer;

subjecting the extrudate to at least one water-cooling stage in which the extrudate is contacted with water for a first period of time; and thereafter, subjecting the water-cooled extrudate to at least one air-cooling stage in which the extrudate is contacted with air for a second period of time, wherein the air-cooled extrudate has a moisture content of from about 1,000 to about 10,000 parts per million, wherein a film formed from the thermoplastic starch-based composition exhibits a percent strain at break in the cross-machine direction of about 550% or more.

13. The method of claim 12, wherein the polyolefin is a copolymer of an ethylene and an α-olefin; and the biodegradable polymer is an aliphatic-aromatic copolyester.

14. The method of claim 13, wherein the compatibilizer has a polar component and a non-polar component, the non-polar component being provided by an olefin.

* * * * *